(12) United States Patent
Burns

(10) Patent No.: US 8,231,315 B2
(45) Date of Patent: Jul. 31, 2012

(54) STACKABLE ARMORED VEHICLE

(75) Inventor: Steven F Burns, Huntertown, IN (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 0 days.

(21) Appl. No.: 13/241,513

(22) Filed: Sep. 23, 2011

(65) Prior Publication Data

US 2012/0139199 A1 Jun. 7, 2012

Related U.S. Application Data

(62) Division of application No. 12/504,990, filed on Jul. 17, 2009, now Pat. No. 8,057,138.

(51) Int. Cl.
*B60P 7/00* (2006.01)

(52) U.S. Cl. ............... 410/32; 410/54; 410/66; 410/68; 410/4

(58) Field of Classification Search .................... 410/31, 410/32, 54, 66, 67, 68, 44, 4, 56, 46; 296/184.1; 220/23.6

See application file for complete search history.

(56) References Cited

U.S. PATENT DOCUMENTS

| | | | |
|---|---|---|---|
| 4,611,817 A | 9/1986 | Dewing | |
| 4,805,720 A | 2/1989 | Clenet | |
| 4,986,705 A | 1/1991 | Durkin | |
| 5,082,082 A | 1/1992 | Hvolka | |
| 5,417,300 A | 5/1995 | Shultz | |
| 6,416,264 B2 * | 7/2002 | Heim et al. | ........... 410/4 |
| 6,729,817 B1 | 5/2004 | Fennell | |
| 6,904,994 B2 | 6/2005 | Coutant | |
| 7,014,234 B2 | 3/2006 | Walker | |
| 7,354,231 B2 | 4/2008 | German | |
| 8,057,138 B2 * | 11/2011 | Burns | ........... 410/32 |

OTHER PUBLICATIONS

Web page showing details of Fuchs 2 Armoured Wheeled Vehicle, Germany, Oct. 5, 2006.
Fuchs Image 1, Oct. 18, 2006.
Web page from GlobalSecurity.org showing details about Casspir, Oct. 5, 2006.
Casspir Image 1, Oct. 5, 2006.
Casspir Image 2, Oct. 5, 2006.

* cited by examiner

*Primary Examiner* — Stephen Gordon
(74) *Attorney, Agent, or Firm* — Jeffrey P. Calfa; Mark C. Bach

(57) ABSTRACT

Embodiments comprise a stackable vehicle which may be supported from, or serve as support to, another like vehicle. The vehicle includes a frame and a body supported from the frame. The body includes a weight bearing roof. Wheel assemblies are mounted for rotation on the frame. The body includes recesses from the roof of the body to accommodate location of wheel assemblies of a like vehicle supported on the roof. Support and mounting points are located on the roof and on the frame respectively to fix location of a vehicle to be carried on top of a supporting vehicle.

1 Claim, 5 Drawing Sheets

STACKABLE ARMORED VEHICLE

BACKGROUND

Military and emergency services frequently require vehicles which can be readily transported by ship, heavy lift aircraft or train to remote locations. Motor vehicles are typically relatively light per unit of volume, and accordingly place a greater demand on available space as compared to the weight carrying capacity of the means of conveyance. Available space may be considered in terms of both floor area and volume. There is a need to arrange vehicles in a compact fashion.

U.S. Pat. No. 5,082,082 to Hvolka proposed a Multi-Purpose Service Vehicle which was based on a U-shaped frame allowing vehicles to be interlocked. This arrangement was intended to provide a compound vehicle of increased pulling power, though it also allowed a group of vehicles to be stored occupying an area somewhat smaller in size than the external dimensions of the vehicles would suggest, though this aspect of the system was not discussed.

Intermodal containers have often been stacked to minimize floor or deck area occupied. U.S. Pat. No. 6,729,817 extended this concept to integrating such containers with vehicle trailers, allowing the trailers to be stacked. Supporting wheels for the trailer were disposed rearward from the container so that a supporting container did not interfere with projection of the wheels below the upper surface of the supporting container/trailer combination. The lower vehicle supports the stacked vehicle at corner "hard points" referred to in the art as corner castings or corner fittings. U.S. Pat. No. 7,354,231 taught an intermodal truck allowing stacking from like trucks. Essentially the upper surfaces of the vehicles were strengthened and modified to allow a second vehicle to be placed on a first supported on its wheels. The vehicles also provide corner fittings to allow a container to be directly stacked on a vehicle.

SUMMARY

Embodiments described herein relate to a stackable vehicle. In one embodiment, a stackable vehicle comprises a vehicle frame, a weight bearing vehicle body supported from the vehicle frame and having an upper surface, a plurality of lower support fittings distributed about and depending from the vehicle frame, and a plurality of upper mounting fittings distributed about the upper surface of the weight bearing vehicle body.

In another embodiment, a vehicle comprises four roof support points disposed at vertices of a rectangle, a vehicle frame, and an armored body including a roof from which the four roof support points are supported and which provides for transferring loads imposed on the four roof support points to the vehicle frame.

In an additional embodiment, a vehicle comprises a frame, a body including a weight bearing roof, the body being supported on the frame, wheel assemblies mounted for rotation from the frame, and body recesses from the roof of the body to accommodate location of wheel assemblies of a like vehicle supported on the roof.

DETAILED DESCRIPTION

Figure 2:
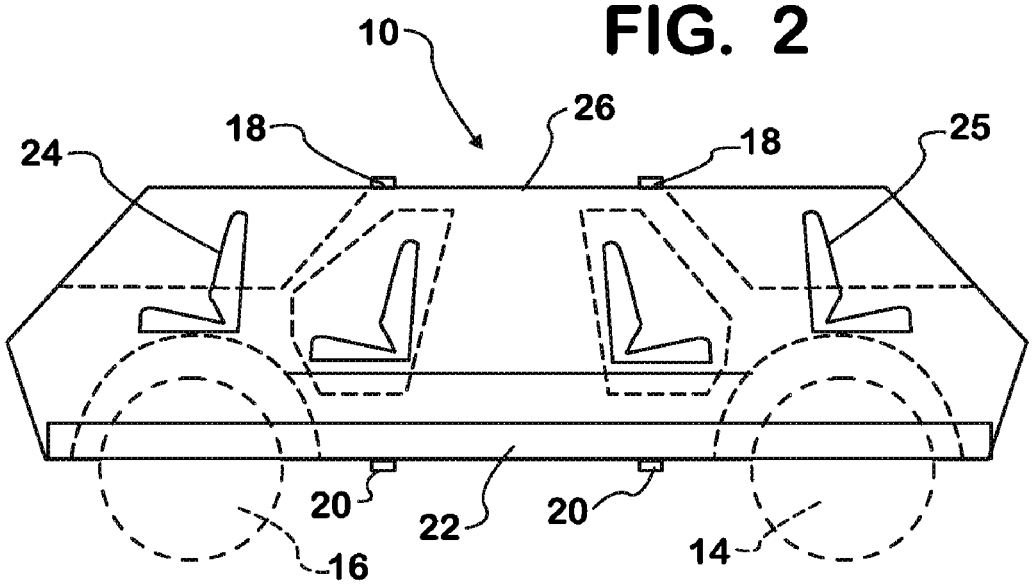
FIG. 2 is a sectional view of the vehicle of FIG. 1.
Figure 1:
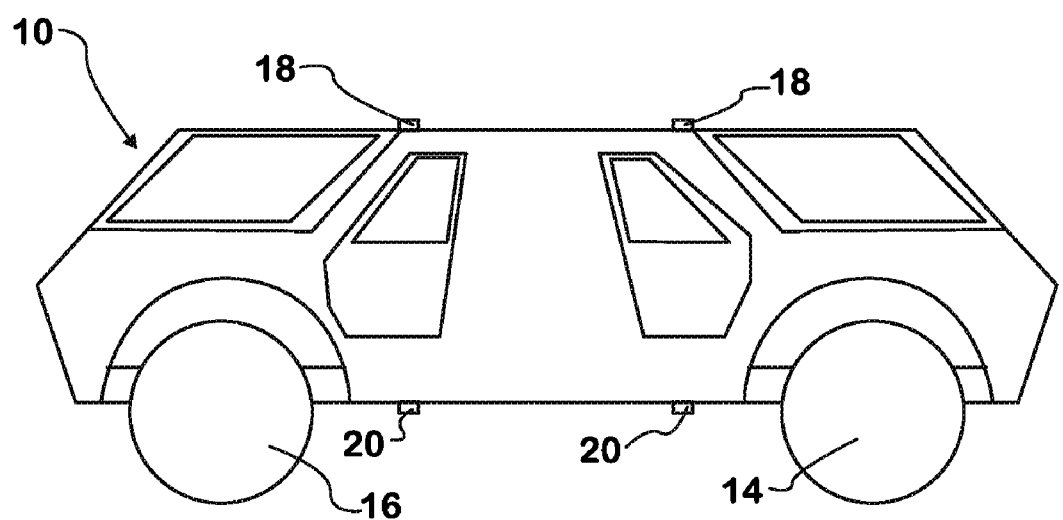
FIG. 1 is a side elevation of an embodiment of a stackable vehicle.
Figure 3:
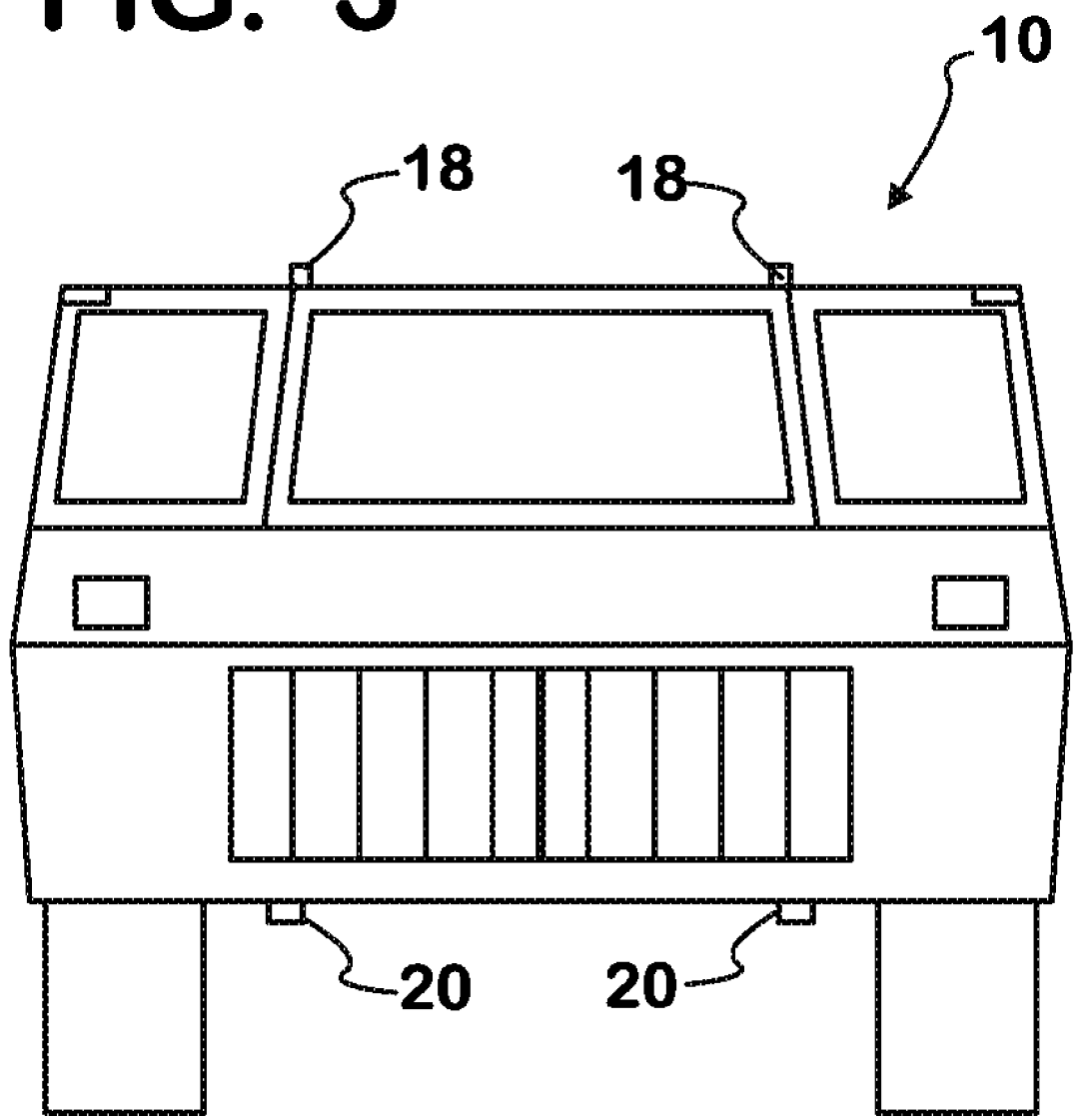
FIG. 3 is a front/rear elevation of the vehicle of FIG. 1.
Figure 4:
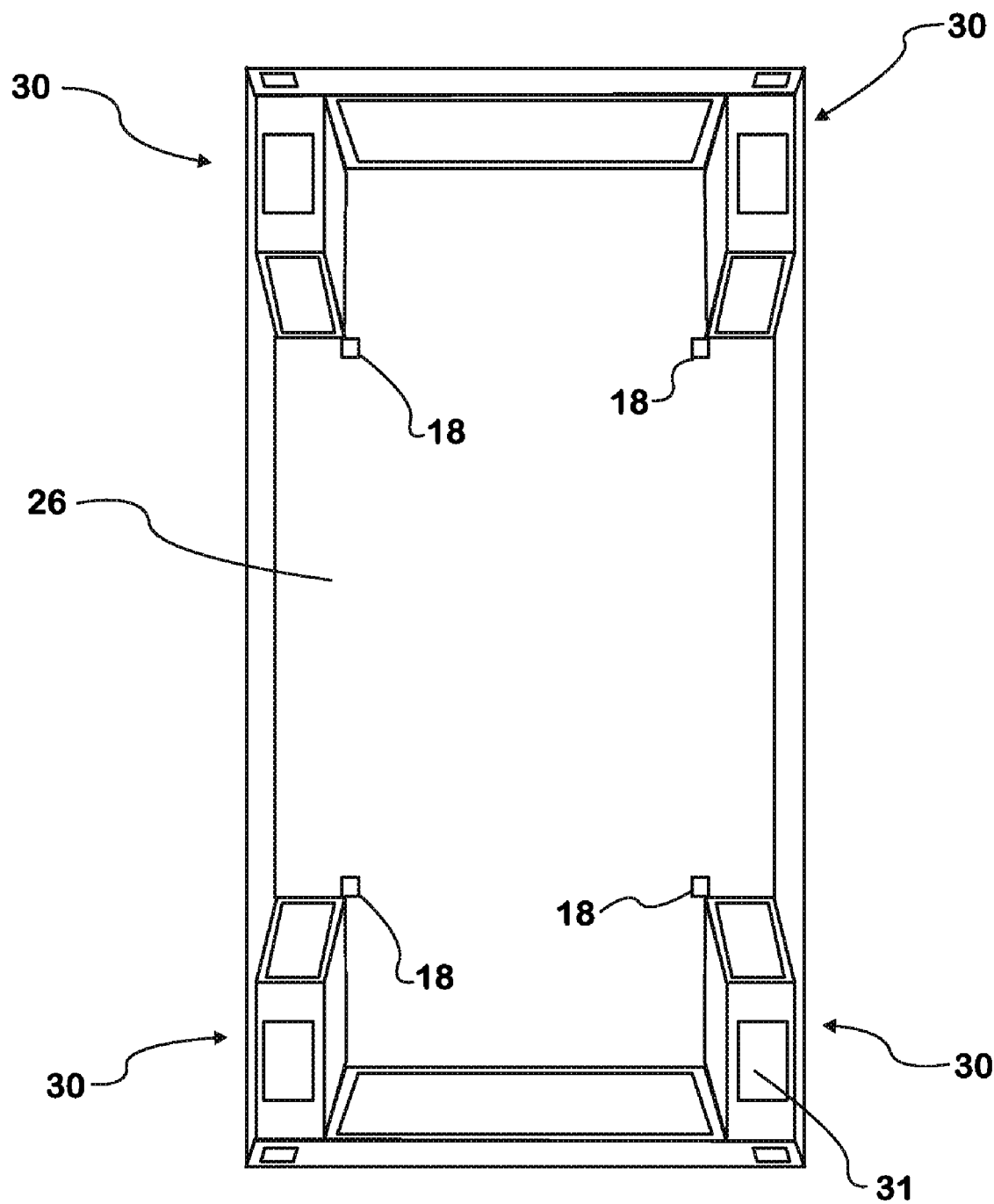
FIG. 4 is a top plan view of the vehicle of FIG. 1.

Referring to the figures and to FIGS. 1-4 in particular, a stackable vehicle 10 is illustrated. Vehicle 10 is a general purpose military vehicle having an armored body 12 supported on a truck chassis or ladder frame 22. Armored body 12 exhibits a high degree of longitudinal and latitudinal symmetry in the horizontal plane, the vehicle 10 being intended to be operable from either a forward facing front operator/driver station 24 or a rear facing aft operator/driver station 25. The operator stations 24, 25 are located on the longitudinal axis (center line) of the vehicle.

Figure 6:
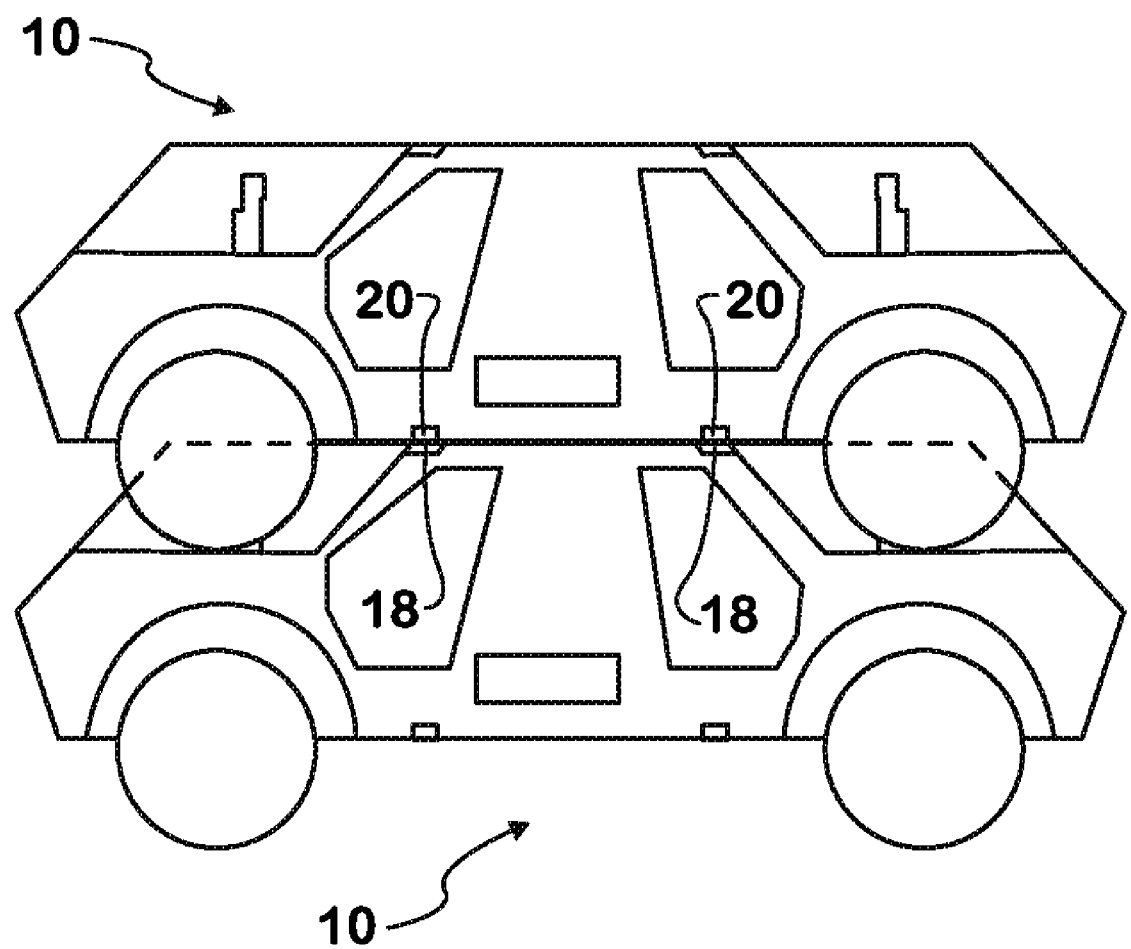
FIG. 6 is a side elevation illustrating stacking of a like vehicle on the vehicle of FIG. 1.

Armored body 12 is also a weight bearing vehicle body mounted to the vehicle frame 12. Body 12 transfers loads imposed thereon as well as its own weight to the frame. Armored body 12 has an upper surface or roof 26 in which are located four mounting fittings 18 for receiving a load equipped with co-operating fittings. An example of such co-operating fittings is frame mounted support fittings 20. In other words, vehicle 10 can be supported from the roof of a like vehicle by lower/frame mounted support fittings 20 or can support a like vehicle from roof mounted or upper mounting fittings 18. See FIG. 6.

As already mentioned, armored body 12 exhibits longitudinal and latitudinal symmetry in the horizontal plane. This symmetry extends to recessing the armored body 12 at the upper corners of the vehicle. Corner recesses 30 are sized and positioned to accommodate the location of wheels from a like vehicle loaded carried on the roof 26 of the armored body 12. Front wheels 16 and rear wheels 14 are mounted for rotation using conventional suspension components from the frame 22 of vehicle 10. In one embodiment the corner recesses 30 are provided at the left and right front of the vehicle and the left and right rear of the vehicle. Reinforced fender indentations 31 for receiving tires mounted on with the wheel assemblies may be provided. It is conceivable that in alternative embodiments recesses would not necessarily be at the corners of a body and might not be symmetrically located front to rear, however, symmetry supports better weight balance of the vehicle from front to rear which improves stability upon stacking.

Figure 5:
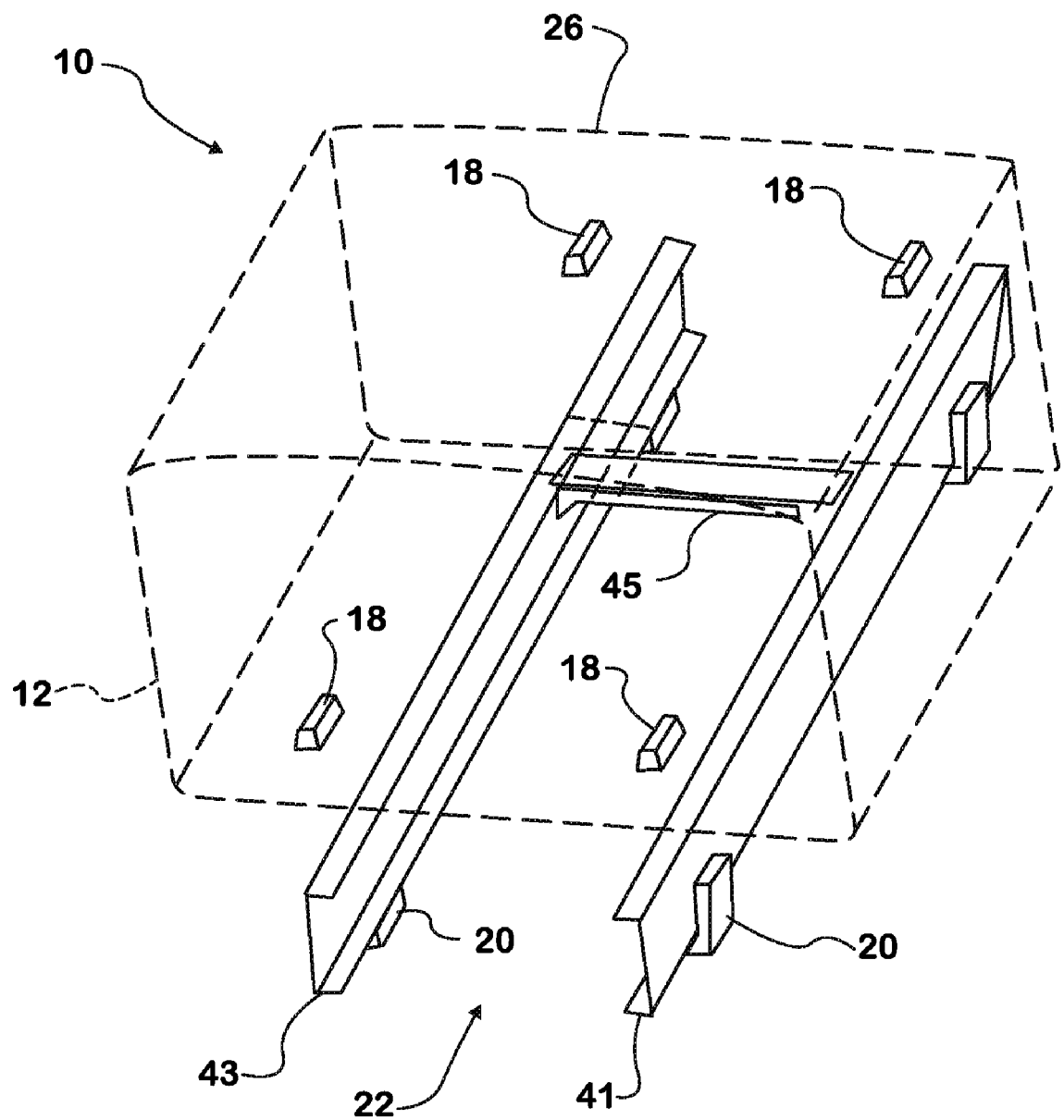
FIG. 5 is a perspective view of a portion of the ladder frame for the vehicle of FIG. 1.

Roof mounting points 18 and frame support points 20 are placed inwardly from the sides of the vehicle and are arranged at the vertices of imaginary rectangles along the bottom and top of the vehicle 10. Pairs comprising one roof mounting point and one frame support point 20 are vertically aligned as shown in FIG. 5. Further referring to FIG. 5, armored body 12 is represented in phantom to better illustrate some concepts disclosed herein, including vertical alignment of a support fitting 20 and a mounting fitting 18. Frame 22 is a ladder frame including a pair of longitudinal frame rails 41, 43 and cross members such as cross member 45. Four frame support fittings 20 are located two to each frame rail 41, 43. Roof mounting fittings 18 are embedded in roof 26 of body 12.

What is claimed is:

1. A vehicle comprising:
   a vehicle frame;
   an armored body including a roof, the armored body being supported from the vehicle frame;
   four roof mounting points located on the roof and supported from the armored body, the four roof mounting points being located at vertices of a rectangle with the armored body providing for transferring loads imposed at the roof mounting points to the vehicle frame; and four frame support points installed on the vehicle frame and located at vertices of a rectangle;

pairs of the frame support and roof mounting points being vertically aligned; and the frame support points and the roof mounting points including mutually cooperating fittings.

* * * * *